March 24, 1942.　　　E. E. HEWITT　　　2,277,106
BRAKE MECHANISM
Filed Jan. 28, 1939　　　2 Sheets-Sheet 1

INVENTOR
ELLIS E. HEWITT
BY A. M. Higgins
ATTORNEY

March 24, 1942.    E. E. HEWITT    2,277,106
BRAKE MECHANISM
Filed Jan. 28, 1939    2 Sheets-Sheet 2

INVENTOR
ELLIS E. HEWITT
BY
ATTORNEY

Patented Mar. 24, 1942

2,277,106

UNITED STATES PATENT OFFICE 2,277,106

BRAKE MECHANISM

Ellis E. Hewitt, Edgewood, Pa., assignor to The Westinghouse Air Brake Company, Wilmerding, Pa., a corporation of Pennsylvania Application January 28, 1939, Serial No. 253,316

31 Claims. (Cl. 188—153)

This invention relates to vehicle brakes and more particularly to the disc type of brake for use on trucks of railway vehicles.

The advent of high speed, streamlined trains with low centers of gravity, has so reduced clearance spaces under the vehicles around the trucks as to make it exceedingly difficult to provide brakes on the vehicle. In some instances certain parts of the vehicle bodies depend so low as to just clear the truck axles. Because of this the clearance between such depending parts and the wheels of the truck is greatly minimized upon movement of the truck relative to these parts when rounding curves in railway tracks, which obviously must be considered. It will therefore be evident that the new type vehicles give rise to new problems in connection with providing brakes, not heretofore encountered.

In addition to the above, the new vehicles require brakes which are more powerful and faster acting, and which provide for more accurate and flexible control of a train than ever before obtained, in order to insure the safety of the train and the comfort of the passenger at all times. This is a major problem and further complicates the provision of an adequate braking system for these modern railway vehicles.

Moreover, a brake system installed in the very limited spaces on these vehicles must be readily accessible for inspection and maintenance. The braking elements must be adequately cooled to provide efficient braking, and this problem of cooling is complicated both by the shielding employed to produce streamlining and low centers of gravities of the vehicles.

One object of the present invention therefore is to provide a compact and efficient disc brake mechanism particularly adapted for use in the limited spaces available on modern vehicles such as above described.

Another object of the invention is to provide an improved fluid pressure brake mechanism for the above type of vehicles in which the brake cylinder means is arranged to act directly on the friction braking elements so as to thereby preclude the need of and space for brake levers and the like as used in conventional types of brake systems.

Another object of the present invention is the provision of a fluid pressure brake mechanism such as just described having an improved brake cylinder piston arrangement for preventing the transfer of heat from the friction braking elements to the brake cylinder piston and thereby possible destructive action of such heat on said piston and the lubricant therefor.

Another object of the invention is to provide an improved disc brake mechanism having an improved system for cooling the braking elements so as to provide for most efficient braking operation thereof.

Other objects and advantages will be apparent from the following more detailed description of the invention.

In the accompanying drawings.

General description

The disc brake mechanism embodying the invention is adapted to be associated with each of any desired number of the wheels of a railway vehicle truck which may be of any desired construction. For the purpose of illustration however, the truck may be of the type having a wheel and axle assembly comprising two spaced wheels 1 and an axle tube 2 extending between and rigidly secured to said wheels for holding same in the desired spaced relation for rolling on rails 3. The tube 2 may be secured to the wheels in any desired manner, but in the illustration is shown provided at the end with an annular sleeve-like end portion 4 which is pressed into an axial bore provided through the adjacent wheel 1, whereby said tube is adapted to rotate with said wheel.

The reference character 5 indicates an axle of the wheel and axle assembly which extends through the tube 2 and beyond the outer faces of the wheels 1, said axle being supported at the ends of the tube 2 by any suitable type of bearings such as roller bearings 6 interposed between the axle and the sleeve-like portions 4 of the sleeve 2.

The axle 5 extends beyond the outer face of the wheels 1 for supporting journal boxes 7 which are journaled on the axle and secured thereon in any desired manner as by means of a nut 8 secured to the end of the axle.

The journal boxes 7 are provided for carrying a truck frame comprising the usual spaced side members 9 and transversely extending members (not shown) for holding the side frames in spaced relation. The side frames are provided with the usual depending spaced pedestal legs 10 slidably mounted in slots provided in the opposite sides of the journal boxes 7.

Only one side of one end portion of the vehicle truck and wheel and axle assembly above described are shown in the drawings, but in the light of the above description of said truck, the showing is deemed sufficient for a clear understanding of the invention. The improved disc brake mechanism which is adapted to be associated with one or more of the wheels 1 will now be described.

*Description of disc brake mechanism*

An annular ring-like torque member 11 encircling the axle 5 outside of the wheel 1 is provided at one end with a cylindrical portion 12 which slidably fits within the annular sleeve-like portion 4 of tube 2 and which bears through a washer or gasket 13 against the outside race of the support bearing 6. The torque ring 11 is provided at the opposite end with an outwardly extending collar 14 in axial alignment with the sleeve-like portion 4 of tube 2 and through said collar and sleeve-like portion there are provided a plurality of bolts 15 which rigidly secure said torque ring to said tube and thereby to the wheel 1 for rotation therewith.

Encircling the bolts 15 are three annular, ring-like friction braking elements or discs 16, 17, 18; the elements 16 and 17 being of the same outside diameter but the element 18 which is closest to the wheel being of a considerably greater diameter.

The rotatable braking element 16 is slidably supported on a cylindrical surface 19 provided on the torque ring 11 adjacent the inner surface of the bolts 15 and is provided with spaced notches 20 which fit over the several bolts 15 whereby said element is secured to rotate with the wheel 1.

The torque ring 11 is provided adjacent the end of tube 2 with a cylindrical surface 21 of smaller diameter than surface 19, and the two elements 17 and 18 are preferably slidably mounted thereon for support. The elements 17 and 18 are both provided with suitably spaced bores through which the bolts 15 extend for securing said elements to rotate with the wheel 1.

The web 22 of the wheel 1 is formed at an angle to the axis of said wheel and interposed in the space between said web and the rotatable braking element 18 is an annular filler block 23 so shaped as to support said element in a plane at right angles to the axis of the wheel when said element is forced in the direction of the wheel, as will be later described. This filler block 23 may be made of any desired material such as metal, or if desired of hard pressed asbestos to insulate the braking element 18 from the wheel 1, and it is preferred that said block extend inwardly sufficiently far to substantially engage the end portion 4 of tube 2.

Interposed between each pair of rotatable braking elements 16, 17, and 18 and encircling the bolts 15 is a brake release spring 24 under compression. The spring 24 engaging the elements 17 and 18 is provided for urging the element 17 away from the element 18 into engagement with a shoulder 25 which joins the cylindrical surfaces 19 and 21 on the torque ring 11, while the other spring is provided for urging the element 16 into engagement with the collar 14, said shoulder and collar acting to define the brake release positions of said elements.

Each of the rotatable braking elements 16, 17, and 18 is provided in its opposite faces with a plurality of spaced, radial arranged slots 100, the slots 100 in one face of each element being staggered with respect to those in the opposite face. These slots are provided to act as fan blades to induce a circulation of air as will be later described.

An annular flange 27 projects radially from the side of the journal box 7 adjacent wheel 1 and is joined at its periphery to one end of a cylindrical extension 28 projecting in the direction of wheel 1. The other end of the extension 28 carries a radially extending ring portion 29 which is provided around the face adjacent the wheel 1 with a plurality of equally spaced cylindrical bosses 30 projecting towards the wheel 1 with their axes parallel to that of said wheel. Each of the bosses 30 is provided with an axial bore in which there is slidably mounted a torque pin 31.

Encircling the bolts 15 and interleaved with the rotatable braking elements 16, 17, and 18 are three annular, non-rotatable friction braking elements 32, 33, and 34, the element 32 being disposed adjacent the outer face of the rotatable element 16; the element 33 being interposed between the rotatable elements 16 and 17; while the element 34 is interposed between the rotatable elements 17 and 18.

Each of the non-rotatable braking elements 32, 33, and 34 comprises a backing plate 35 preferably made of steel or the like and preferably of the same outside diameter as the rotatable braking element 18. A friction braking ring 36, of the same outside diameter as the rotatable braking elements 16 and 17 is secured to each of the adjacent faces of the backing plates 35 of the non-rotatable braking elements 32 and 34 and to both faces of the backing plate of the non-rotatable braking element 33, the several friction rings being in concentric relation with said rotatable braking elements. A friction braking ring 37 of the same outside diameter as the rotatable braking element 18 is secured to the outer face of the backing plate 35 of the non-rotatable braking element 34 in concentric relation and for frictional engagement with the rotatable braking element 18.

The friction rings 36 and 37 are preferably made of cast iron secured to their respective backing plates 35 in any desired manner.

The backing plate 35 of the non-rotatable braking element 32 is provided around its periphery with a plurality of notches 38 corresponding in number and spacing to the cylinder bosses 30. The notches 38 fit around the bosses 30 with sufficient freedom to provide for axial movement of the non-rotatable element 32 and are adapted to support said element in braking relation with the rotatable braking element 16 and also hold said non-rotatable braking element against turning with said rotatable braking element relative to the journal box 7.

The backing plate 35 of the intermediate non-rotatable braking element 33 is provided with spaced bores through which the several torque pins 31 extend for supporting said element and for holding same against turning, said element being capable of sliding movement on the pins 31. The ends or heads of the several torque pins 31 adjacent the non-rotatable braking element 34 are secured by welding or in any other desired manner to the backing plate 35 of said element for supporting same in the desired braking position and for holding same against turning.

A brake release spring 42 is provided around each of the bosses 30 acting on the non-rotatable brake elements 32 and 33 for urging the non-rotatable brake element 32 to its release position defined by engagement with the ring portion 29 of the journal box at the bases of the bosses 30. Another brake release spring 41 is provided around each of the torque pins 31 acting on the non-rotatable brake elements 33 and 34 for moving the non-rotatable brake element 33 to its release position defined by engagement thereof with the ends of the bosses 30.

Each of the bosses 30 is provided with a counterbore open to the outer face thereof and through which the respective torque pin 31 extends. A brake release spring 39 encircling the torque pin 31 within each of these counterbores acts on a washer 40 secured to the outer end of the respective torque pin. The several springs 39 are provided for operating the springs 41 and 42 to move the non-rotatable brake elements 32 and 33 to their brake release positions above described, and in so acting are adapted to pull the non-rotatable element 34 to its release position shown in the drawing, and at which time the spring 41 will substantially counteract the springs 39. The parts are so designed that with both the rotatable and non-rotatable braking elements in their release positions above described, said elements will all be disengaged from each other to permit the rotatable braking elements 16, 17, and 18 to freely turn with the wheel 1.

The journal box comprises a central journal and guide section 43 for the pedestal legs 10, the annular flange 27, hereinbefore described, at the inner end of said section and further comprises an oppositely disposed flange 44 at the outer end of said central section. A cover 45 is secured by bolts 46 to the flange 44 over the end of axle 5.

The cover 45 is provided with an annular ring-like brake cylinder 47 having parallel inside and outside cylindrical walls 48 and 49 the mean diameter of which is greater than that of the central portion 43 of the journal box 6, but only slightly less than the diameter of a circle extending through the axes of bolts 15.

An annular ring-like piston 50 is slidably mounted in the brake cylinder 47 between the side walls 48 and 49 thereof. The piston 50 comprises a piston head 51 having a peripheral groove in which there is provided a lubricant carrying ring 52 made of felt or the like, and a flexible packing cup 53 secured to the pressure face of the piston head in any desired manner. An annular pressure chamber 54 is provided at the front face of the packing cup 53 and is connected to a pipe 55 through which fluid under pressure is adapted to be supplied to and released from said chamber in any desired manner for controlling the braking operation of the braking discs, as will be later described. At the opposite side of the brake cylinder piston there is provided a non-pressure chamber 56; a ring gasket 57 made of cork or the like being compressed between the cover 45 and the outer end of the journal box for preventing leakage of foreign matter or lubricant between the chamber 56 and the chamber in said cover in which the end of axle 5 is disposed.

A pressure ring 58 is disposed within the cylindrical extension 28 at the inner end of the journal box, said ring having an outer annular foot-like portion 59 engaging the backing plate 35 of the non-rotatable element 32 and an inner annular portion 60 slidably mounted on a cylindrical bearing 61 provided at the inner end of the journal box in axial alignment with the brake cylinder piston 50 and the braking discs hereinbefore described.

A plurality of spaced, aligned sets of bores are provided through the spaced journal box flanges 27 and 44, and slidably mounted in each of these sets of bores is a strut or pusher pin 62, one end of which engages the pressure ring 58 while the other end engages the low pressure face of the brake cylinder piston 50.

The several pusher pins 62 are so located at the sides of the journal box as to clear the truck frame pedestal legs 10 and one or more is provided with an axial bore 63 open at the piston end to an annular groove 64 in the piston head 51 and at the opposite end to a cross bore 65 in the pin which leads to the atmosphere. The annular groove 65 is connected by one or more slots 66 provided in the piston head 51 between the pusher pins 62 to the non-pressure chamber 56. It will thus be evident that upon reciprocation of piston 50 in the brake cylinder, air is adapted to freely flow out of and into the non-pressure chamber 56. An air strainer 67, made of hair or any other desired air straining material is pressed into the bore 63 in the pusher pin 62 to prevent entrance of dirt to the non-pressure chamber 56 during the breathing operation just described.

In order to prevent dirt entering the non-pressure chamber 56 along the pusher pins 62, a flexible boot 68 is provided on each of the pusher pins 62, one end of said boot being tightly secured around the pusher pin, while the other end is tightly sprung into a suitable circular groove provided around the pusher pin in the flange 44 of the journal box.

The journal box flange 44 is provided at the top and bottom with a pair of diametrically opposite outstanding lugs 69 to which are pivotally connected by transversely extending pins 70 one end of two substantially parallel torque rods 71. The other end of the top torque rod 71 is pivotally connected by a transverse pin 72 to a bracket 73 secured to the side frame of the truck adjacent the top thereof, while the other end of the lower torque rod 71 is pivotally connected by a like pin 72 to a bracket 74 secured to said side frame adjacent the lower portion thereof. By this arrangement the truck frame pedestal legs 10 are free to slide relatively to the journal box 7 in the usual manner and even with the brakes on the truck applied as will be later described.

The journal box flange 27 is provided with a plurality of openings 75 adjacent the central guide section 43 thereof which are open at one end to the space between the journal box flanges 27 and 44 and thus to the atmosphere. The other end of the openings 75 open into a chamber 76 provided between the pressure ring 58 and the torque ring 11; it being noted that the engagement of the pressure ring 58 at one end with the surface 61 and at the other end with the non-rotatable element 32 closes communication between chamber 76 and the space around the outer surface of said pressure ring.

The torque ring 11 is provided with a plurality of slots 77 leading from the chamber 76 to the inner peripheral edges of the non-rotatable brake elements 33 and 34, while in the annular space between said edges and the collar 14 on the torque ring 11, the rotatable braking elements 16, 17, and 18 are provided with a plurality of openings 78 of any desired size or shape connecting the opposite sides of said elements.

The torque ring 11 is provided with a plurality of radial fins or fan blades 79 extending into the chamber 76 for rotation with the torque ring 11 and thereby with the wheel 1.

In order to prevent creepage or passage of lubricant from the wheel bearing 6 to the annular rotatable and non-rotatable friction braking elements or discs; the torque ring 11 is provided with an inwardly directed web having at its inner peripheral edge two oppositely disposed annular oil throwers 80 and 81, the thrower 80 being provided on the side adjacent the wheel bearing 6, while the oil thrower 81 at the opposite side is disposed to turn in an annular U shaped trough like chamber 82 provided within a lip-like extension 83 of the journal box which encircles a spacer 84 provided on the axle 5 between the journal box bearing and the inner race of the roller bearing 6. The chamber 82 is open below the axle and spacer 84 to a drain duct 85 extending through the journal box flange 27.

A deflector ring 86 is secured to the inner race of the wheel bearing 6 and extends out over the oil thrower 80, said ring being provided to separate insofar as possible direct contact between the lubricant in bearing 6 and the oil thrower 80. In case lubricant does however pass the deflector 86 and get on to the thrower 80, said thrower tends to prevent the lubricant from getting further from the bearing, since rotation of said thrower with the wheel will act to throw such lubricant back on to the deflector ring 86 from whence such lubricant will drain back to the bearing side of said thrower.

An annular inwardly directed lip 87 is provided between the throwers 80 and 81 to minimize the creepage of lubricant from the thrower 80 to the thrower 81, since as will be evident, any creepage past the lip 87 is opposed by centrifugal force when the wheel is rotating.

In case, however, any lubricant should get past the lip 87 to the thrower 81, a lip 88 encircling the outer circumferential edge thereof will throw said lubricant into the trough 82 from whence it will drain to the bottom of said trough and out through the drain duct 85 away from the braking discs.

The spacer 84 is intended to remain stationary so that any lubricant which may be obtained thereon from either the wheel bearing 6 or from the bearing of axle 5 in the journal box will either drip by gravity on to the oil thrower 81 and be thrown into the oil drainage trough 82 or drip directly into said trough, and in order to encourage such drainage and prevent lubricant passing between said bearings, two spaced rings 89 are provided on said spacer.

The lip 83 and the oil thrower 81 beyond the end of said lip also act to block the entrance of foreign matter, which may drop by gravity from the brake mechanism, to the spacer 84 and thence to the wheel bearing 6 and to the axle bearing in the journal box. The rings 89 encircling the spacer 84 also serve as a further block against entrance of dirt to these bearings.

The periphery of the ring portion 29 of the journal box carrying the torque pins 31 is encircled by a ring-like nut 90 having screw threaded engagement therewith. The nut 90 is provided with an inturned annular flange 91 extending over the outer ends of the torque pins 31 and adapted upon movement of the nut toward the wheel 1 to push said pins through the bosses 30 in the direction of said wheel.

The nut 90 is provided for manually controlling the brakes on the wheel and is adapted to be connected up for control to any desired manually operative means such as the usual hand wheel or lever (not shown) provided on railway vehicles.

Operation

In the drawings, the various parts of the brake mechanism are shown in the positions which they assume when the brakes on the wheel 1 are released, and it will be noted that the non-rotatable braking elements 32, 33, and 34 are disengaged from the rotatable braking elements 16, 17, and 18, whereby said rotatable braking elements are free to rotate with the wheel 1.

If the wheel 1 is rotating and it is desired to effect braking thereof, fluid under pressure is supplied through pipe 55 to the annular brake cylinder piston chamber 54 wherein it acts on the brake cylinder piston 50 to move same and thereby the several strut pins 62 and pressure ring 58 relative to the journal box 7 in the direction of the wheel 1.

As the pressure ring 58 is thus operated, it slides the non-rotatable braking element 32 on the bosses 30 into frictional contact with the adjacent rotatable braking element 16 which is then picked up on further movement of the pressure ring and urged along the surface 19 on the torque ring 11 into frictional contact with the non-rotatable element 33. The element 33 is then slipped along the torque pins 31 into frictional contact with the rotatable element 17 which then is shifted on the surface 21 of the torque ring 11 into frictional contact with the non-rotatable breaking element 34. The element 34 is then picked up and moved into frictional contact with the rotatable braking element 18 backed up against the wheel 1. This movement of the non-rotatable braking element 34 is accomplished by sliding of the torque pins 31 in the bosses 30, as will be evident.

After the several interleaved non-rotatable and rotatable braking elements are all serially moved into contact with each other by the initial or preliminary movement of the brake cylinder piston 50, said piston acts to force said elements together and the consequent frictional drag of the non-rotatable braking elements on the rotatable braking elements effects braking of said rotatable braking elements which braking action is transmitted through the bolts 15 to the wheel 1 to stop or retard rotation of said wheel. The degree with which the wheel 1 is thus braked depends upon the pressure of fluid supplied to chamber 54 for acting on the brake cylinder piston 50 and may be varied to effect any desired degree of braking in the usual well known manner.

It will be evident that when the brakes are applied, the non-rotatable braking elements 32, 33, and 34 and thereby the journal box to which said elements are connected tend to turn with the rotatable braking elements 16, 17, and 18. This tendency is however counteracted by the two torque rods 71 connecting the journal box to the truck side frame 9, said rods acting to hold said journal box in its usual free sliding relation between the truck pedestal legs 10.

When it is desired to effect a release of the brakes after an application, the fluid pressure is vented from the brake cylinder piston chamber 54 which relieves the pressure on the brake cylinder piston 50 and thereby on the non-rotatable and rotatable braking elements. This permits the several springs 24, 41, 42 and 39 to move the braking elements back to their release positions shown in the drawings in which the rotatable braking elements and thereby the wheel 1 are again free to rotate. It is here desired to point out that the release springs 41, 42 and 39 are not only designed to move the non-rotatable elements to their release positions but also are adapted to act through the non-rotatable brake element 32 to return the pressure ring 58, pusher pins 62, and thereby the brake cylinder piston 50 to their release positions.

At all times when the wheel 1 and rotatable braking elements are turning, the fan blades 79 associated with the torque ring 11 act to force air out of the chamber 76, which is open to the atmosphere through openings 75, by way of the slots 77 in the torque ring 11 and the apertures 78 in the rotatable braking elements to the inner peripherial edges of the non-rotatable braking elements from whence, with the brakes released, the air flows out through the spaces between the rotatable and non-rotatable braking elements and through the slots 100 in the rotatable braking elements to the atmosphere. When the brakes are applied this flow of air is only through the slots 100, but in both cases the side walls of said slots also act as fan blades to augment the action of the fan blades 79 and provide an increased or more rapid circulation of air.

While this circulation of air between and around the several braking elements effects cooling thereof subsequent to an application of the brakes, it is of especial importance for dissipating heat from said elements while in frictional braking contact in order to prevent excessive heating thereof and thus provide for most efficient braking. During braking it will be noted that the slots 100 in the rotatable braking elements are open directly to the faces of the adjacent non-rotatable braking elements, so that air is not only drawn through said slots but such air passes directly over the braking faces of the non-rotatable elements; thus both the rotatable and non-rotatable elements are cooled by direct contact with the air stream.

The slots 100 also serve another important function in that they are adapted to receive and promptly expel to the atmosphere, any particles of metal torn from the braking elements or any other foreign matter, so that during braking a most intimate contact will be maintained between the friction faces of the braking elements. This results in a more uniform breaking torque and a more efficient brake.

In this connection it will be noted that cooling slots 100 are also provided in the face of the rotatable braking element 18 which engages the filler block 23 and this also is important since the flow of air through these slots will reduce the transfer of heat from said element to said block and thus to the web 22 of the wheel 1.

The brake cylinder device 47 is located in the journal box cover 45 remote from the friction breaking elements as shown, in order to facilitate inspection and maintenance and also to provide maximum protection thereof from the heat generated in the braking elements during braking; which heat would be destructive not only to the lubricant for the brake cylinder piston 50 but also to the flexible packing cup 53. Due to this remote location the brake cylinder device is also substantially insulated against the transfer of heat from the friction braking elements by the air currents which will flow between said brake elements and the brake cylinder device incident to movement of the vehicle. It is however desired to note that even with this remote location, the pusher pins 62 provide for direct action of the brake cylinder piston on the braking elements without the use of levers and the like which are subject to wear and require space not available on certain modern vehicles.

In case it is desired to set the brakes on the vehicle by hand, the ring-like nut 90 is turned so as to move in the direction of the wheel 1 and this movement acts through the flange 81 on said nut to urge the torque pins 31 and thereby the innermost non-rotatable braking element 34 inwardly until said element is forced against the rotatable braking element 18. The element 18 is thereby braked to brake the wheel 1. To release the handbrake, the nut 90 is turned in the reverse direction which permits the springs 39 to draw the non-rotatable braking element 34 out of braking contact with the rotatable braking element 18.

Figures 1, 4:
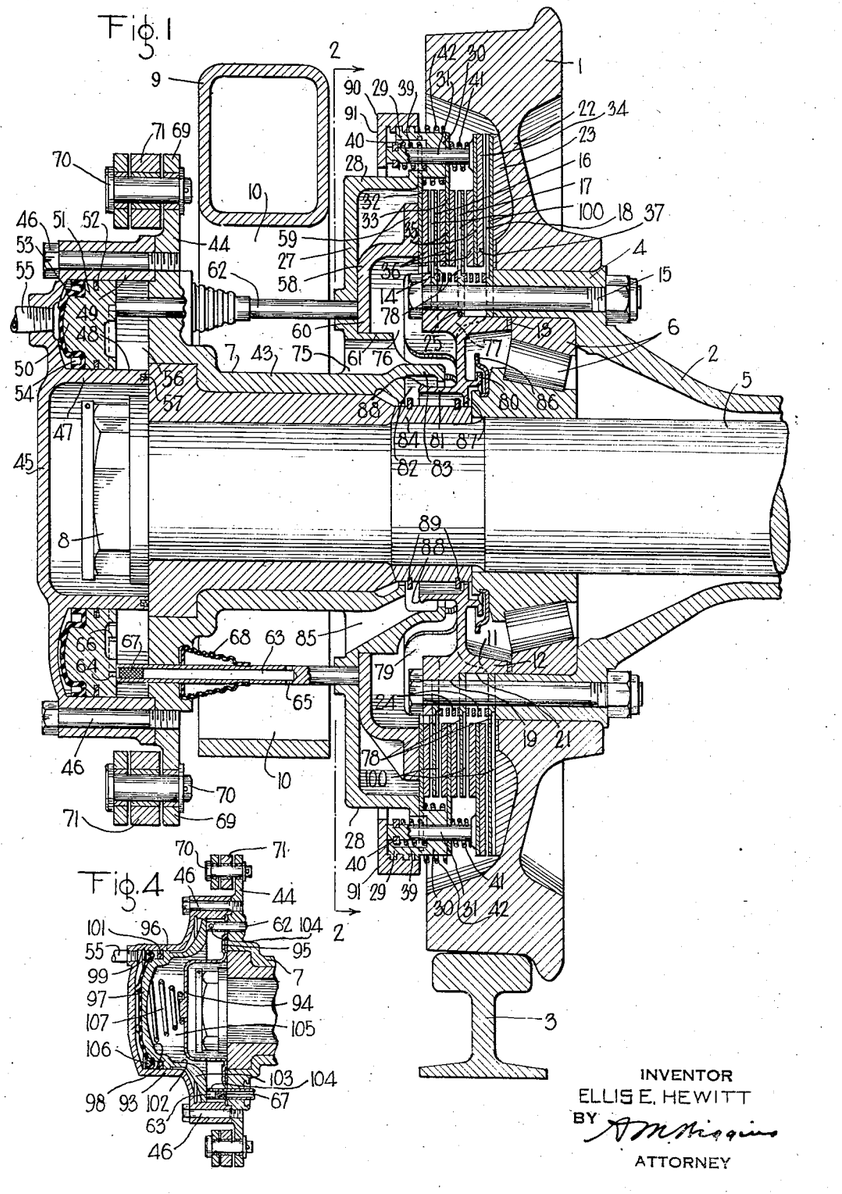
Fig. 1 is a vertical sectional view taken through a wheel and axle assembly at one side of a vehicle truck and showing, mainly in section, one form of the improved brake mechanism applied thereto.
Fig. 4 is a sectional view, similar to a portion of Fig. 1 at a reduced scale, but showing a modification of the invention.
Figure 2:
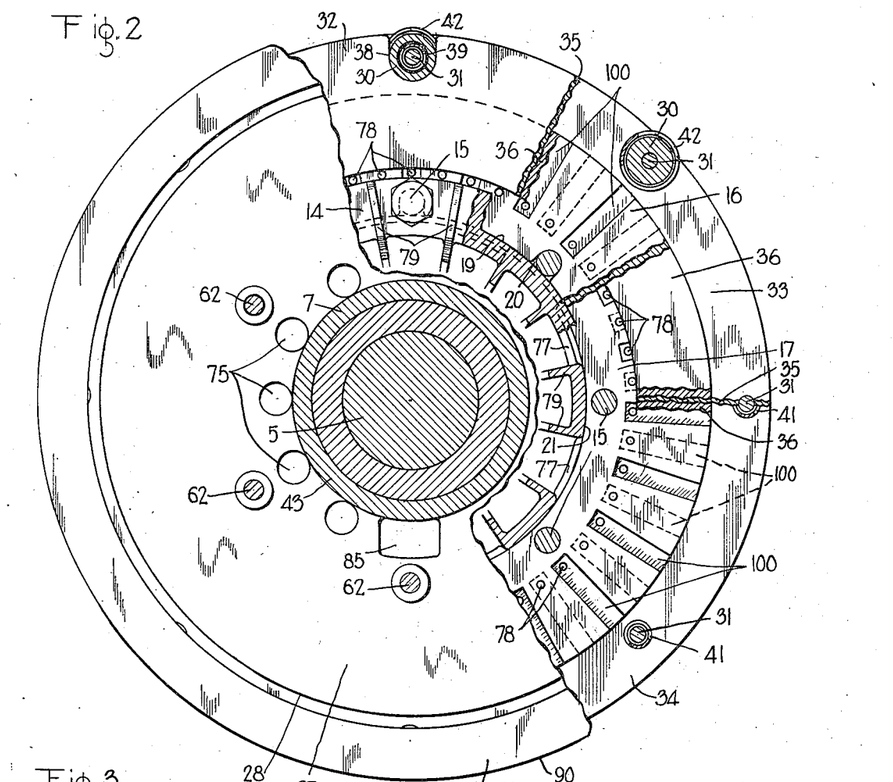
Fig. 2 is a sectional view taken on the line 2—2 in Fig. 1 and having certain parts broken away to show the interior construction of the mechanism.
Figure 3:
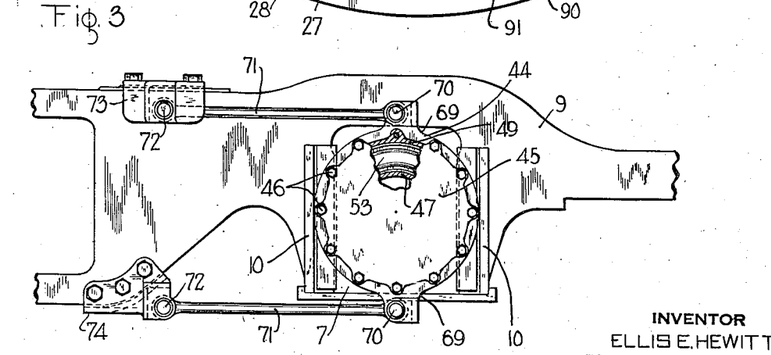
Fig. 3 is an elevational view of a portion of one side of the truck showing the improved brake mechanism mounted thereon.

Modification in Fig. 4

In the modification a cover 93 is secured over the end of the journal box 7 in place of the cover 45, and between the cover 93 and journal box a cap 94 is clamped over the end of the axle 5. A resilient gasket 95 made of cork or the like is clamped between the cap 94 and the journal box for the same reason as gasket 57 in the construction shown in Fig. 1.

The cover 93 is provided centrally with a brake cylinder bore 96 in axial alignment with axle 5, and slidably mounted in this bore in a disc-like, preferably cup shaped brake cylinder piston 97 comprising a piston head 98 and a flexible packing cup 99 secured over the pressure end of said head. A lubricant ring 101 is disposed in an annular groove in the piston head 98 back of the cup 99 for lubricating the bore 96.

The piston head 98 is provided opposite the packing cup with a skirt 102 joined at its outer end to an outwardly extending annular pressure ring 103 which engages the ends of the pusher pins 62. Adjacent the pressure ring 103, each of the pusher pins is provided with a cross bore 104 connecting the bore 63 to a non-pressure chamber 105 at one side of the brake cylinder piston for the purpose of breathing. A pressure chamber 106 is provided at the opposite side of the brake cylinder piston connected to the fluid supply pipe 55.

In the non-pressure chamber 105 a conical spring 107 is provided having one end supported on the cup 94 while the other end acts on the brake cylinder piston 97 in the direction to move it to its release position. By this arrangement the release movement of the brake cylinder piston is independent of the brake release springs 41, 42, and 39, in contrast to the structure shown in Fig. 1.

The operation of this modified form of the invention is substantially the same as that in Fig. 1; the piston 97 being operative by fluid under pressure supplied to pressure chamber 106 to effect an application of the brakes and being operative upon the release of fluid under pressure from said chamber to effect a release of the brakes, as will be evident. Further description of the operation is not deemed essential.

The above described brake mechanism is readily applicable to most if not all railway vehicles and is particularly adapted for use on modern, low slung vehicles where there is little or no available space between the wheels and around the axles for the installation of brake mechanism. It will be noted that except for the brake cylinder device, the brake mechanism is mounted in the limited space provided between the wheel and journal box, and while the outer peripheries of the brake elements are substantially surrounded by the tread portion of the wheel, an efficient cooling system is provided embodying the fan blades 78 and the slots 100 in the rotatable elements which are the equivalent of a second fan arranged in series and therefore booster relation to the fan blades 78.

By locating the direct acting brake cylinder device remote from the braking elements, said brake cylinder device is protected against the damaging effects of heat developed in the braking elements during braking. It will also be noted that the intended frictional characteristics of the friction braking elements are assured by the provision of an efficient arrangement to keep lubricant from the wheel and axle bearings away from said elements.

While two illustrative embodiments of the invention have been described in detail, it is not the intention to limit the scope to these embodiments or otherwise than by the terms of the appended claims.

Having now described my invention, what I claim as new and desire to secure by Letters Patent, is:

1. A brake mechanism for a wheel and axle assembly of a railway vehicle truck having a journal box carried by said assembly and a truck frame mounted on said journal box, said mechanism comprising an annular rotatable friction braking element disposed adjacent the inner end of said journal box and secured to rotate with one of the wheels of said assembly, an annular non-rotatable friction braking element adapted to be moved into frictional braking engagement with said rotatable braking element for braking said wheel, a brake cylinder device disposed at the outer end of said journal box and operatively connected to said non-rotatable element for controlling the operation thereof, and means for supporting said brake-cylinder device on the outer end of said journal box.

2. A brake mechanism for a wheel and axle assembly of a railway vehicle truck having a journal box carried by said assembly and a truck frame mounted on said journal box, said mechanism comprising an annular rotatable friction braking element disposed between said journal box and one of said wheels and secured to rotate said assembly, an annular non-rotatable friction braking element adapted to be moved into frictional braking engagement with said rotatable braking element for braking said wheel, a brake cylinder piston carried by said journal box at the outer end thereof, and pins operatively connecting said brake cylinder piston to said non-rotatable element for controlling the operation thereof.

3. A brake mechanism for a wheel and axle assembly of a railway vehicle truck having a journal box carried by said assembly and a truck frame mounted on said journal box, said mechanism comprising an annular rotatable friction braking element disposed at the inner end of said journal box and secured to rotate with one of the wheels of said assembly, an annular non-rotatable friction braking element adapted to be moved into frictional braking engagement with said rotatable braking element for braking said wheel, a cover secured to the outer end of said journal box, and a brake cylinder piston in said cover operatively connected to said non-rotatable element for controlling the operation thereof.

4. A brake mechanism for a wheel and axle assembly of a railway vehicle truck having a journal box carried by said assembly and a truck frame mounted on said journal box, said mechanism comprising an annular rotatable friction braking element secured to rotate with one of the wheels of said assembly, an annular non-rotatable friction braking element adapted to be moved into frictional braking engagement with said rotatable braking element for braking said wheel, a brake cylinder piston carried by said journal box at the outer end thereof, and a plurality of pins spaced around and carried by said journal box independently of said piston and operatively connecting said piston to said non-rotatable element for controlling the operation thereof.

5. A brake mechanism for a wheel and axle assembly of a railway vehicle truck having a journal box carried by said assembly and a truck frame mounted on said journal box, said mechanism comprising an annular rotatable friction braking element secured to rotate with one of the wheels of said assembly, an annular non-rotatable friction braking element adapted to be moved into frictional braking engagement with said rotatable braking element for braking said wheel, said journal box having a pair of spaced flanges, one being adjacent the outer end thereof, a cover secured to the outer flange, a brake cylinder piston in said cover, and a plurality of pins slidably mounted in said flanges parallel to the axis of said flanges and operatively connected at one end to said piston and at the opposite end to said non-rotatable element for controlling the operation thereof.

6. A brake mechanism for a wheel and axle assembly of a railway vehicle truck having a journal box carried by said assembly outside of one wheel of said assembly and having a truck frame slidably mounted on said journal box, said mechanism comprising an annular rotatable friction braking element secured to rotate with said wheel, an annular non-rotatable friction braking element disposed to frictionally engage said rotatable element to brake said wheel, a brake cylinder device associated with the outer end of said journal box, and pins operatively connecting said brake cylinder device at one side of said frame to said non-rotatable element at the opposite side of said frame for actuating said non-rotatable element.

7. A brake mechanism for a wheel and axle assembly of a railway vehicle truck having a journal box carried by said assembly outside of one of the wheels of said assembly and having a truck frame mounted on said journal box, said mechanism comprising an annular rotatable friction braking element disposed between said wheel and journal box and secured to rotate with said wheel, a non-rotatable friction braking element carried by said journal box in coaxial relation with said rotatable element and capable of axial movement into frictional engagement with said rotatable element, a brake cylinder device disposed at the outer end of said journal box and operatively connected to said non-rotatable element for controlling axial movement thereof, and means for supporting said brake cylinder device on the outer end of said journal box.

8. A brake mechanism for a wheel and axle assembly of a railway vehicle truck having a journal box carried by said assembly outside of one of the wheels of said assembly and having a truck frame mounted on said journal box, said journal box having a pair of spaced flanges, one flange adjacent the inner end of said journal box and the other adjacent the outer end of said journal box, annular rotatable and non-rotatable friction braking elements adapted to frictionally engage to brake said wheel, said rotatable element being secured to rotate with said wheel, means carried by the inner journal box flange supporting said non-rotatable element, and a brake cylinder device carried by the outer journal box flange operatively connected to said non-rotatable element for controlling movement thereof into frictional engagement with said rotatable element.

9. A brake mechanism for a wheel and axle assembly of a railway vehicle truck having a journal box carried by said assembly outside of one of the wheels of said assembly, said journal box having a pair of spaced flanges, and a truck frame having pedestal legs slidably mounted on said journal box between said flanges, said mechanism comprising annular, rotatable and non-rotatable friction braking elements interposed in the space between said pedestal legs and the adjacent wheel, means securing said rotatable element to said wheel for rotatation therewith, means secured to the inside flange on said journal box supporting said non-rotatable element in coaxial relation with said rotatable element and providing for axial movement thereof into frictional braking engagement with said rotatable element, a brake cylinder device secured to the outer flange on said journal box, and a plurality of pins carried by said journal box in the space between said pedestal legs and operatively connecting said brake cylinder device to said non-rotatable element for controlling movement thereof.

10. A brake mechanism for a wheel and axle assembly of a railway vehicle truck having a journal box carried by said assembly outside one of the wheels of said assembly, and a truck frame slidably mounted on said journal box, said mechanism comprising annular rotatable and non-rotatable friction braking elements disposed in cooperative relation between said wheel and journal box, said rotatable element being secured to said wheel for rotation therewith, means supporting said non-rotatable element from said journal box and providing for axial movement thereof into frictional braking engagement with said rotatable braking element, an axially movable pressure ring carried by said journal box and adapted to engage said non-rotatable element for effecting axial movement thereof, a brake cylinder piston carried by the outer end of said journal box, and a plurality of spaced, parallel pressure pins connected at one end to said piston and at the opposite end to said pressure ring for controlling the operation thereof.

11. A brake mechanism for a wheel and axle assembly of a railway vehicle truck having a journal box carried by said assembly outside one of the wheels of said assembly, and a truck frame slidably mounted on said journal box, said mechanism comprising annular and non-rotatable friction braking elements disposed in co- operative relation between said wheel and journal box, said rotatable element being secured to said wheel for rotation therewith, said journal box having adjacent its inner end a flange and a bearing, means carried by said flange supporting said non-rotatable braking element and providing for axial movement thereof into frictional engagement with said rotatable element, a pressure ring slidably mounted on said bearing and engaging said non-rotatable element for effecting movement thereof, a brake cylinder piston carried by said journal box at the outer end thereof, and a plurality of spaced parallel pins connected at one end to said piston and at the opposite end to said ring for controlling movement of said ring.

12. A brake mechanism for a wheel and axle assembly of a railway vehicle truck having a journal box carried by said assembly outside one of the wheels of the assembly and having a truck frame slidably mounted on said journal box, said mechanism comprising an annular, rotatable friction braking element disposed between said wheel and frame and secured to rotate with said wheel, an annular non-rotatable friction braking element carried by said journal box in coaxial relation with said rotatable element and capable of axial movement into frictional braking engagement with said rotatable element, an annular ring-like brake cylinder piston carried by the outer end of said journal box in coaxial relation with said braking elements, and pressure transmitting means operatively connecting said brake cylinder piston at one end of said journal box to said non-rotatable element at the opposite end of said journal box for controlling the operation of said non-rotatable element.

13. A brake mechanism for a wheel and axle assembly of a railway vehicle truck having a journal box carried by said assembly outside one of the wheels of the assembly and having a truck frame slidably mounted on said journal box, said mechanism comprising an annular, rotatable friction braking element disposed between said wheel and frame and secured to rotate with said wheel, an annular non-rotatable friction braking element carried by said journal box in coaxial relation with said rotatable element and capable of axial movement into frictional braking engagement with said rotatable element, a disc-like brake cylinder piston carried by the outer end of said journal box in axial relation to said assembly, and pressure transmitting means operatively connecting said piston at one end of said journal box to said non-rotatable element at the opposite end of said journal box for controlling the operation of said non-rotatable element.

14. A brake mechanism for a wheel and axle assembly of a railway vehicle truck having a journal box carried by said assembly outside one of the wheels of the assembly and having a truck frame slidably mounted on said journal box, said mechanism comprising an annular, rotatable friction braking element disposed between said wheel and frame and secured to rotate with said wheel, an annular non-rotatable friction braking element carried by said journal box in coaxial relation with said rotatable element and capable of axial movement into frictional braking engagement with said rotatable element, a cover secured to the outer end of said journal box over the end of the axle of said assembly, said cover having a brake cylinder chamber, a gasket between said cover and journal box closing communication between said chamber and the end of said axle, a brake cylinder piston slidably mounted in said chamber, and pressure transmitting means interposed between and operatively connecting said brake cylinder piston at one of said journal boxes to said non-rotatable element at the opposite end of said journal box.

15. A brake mechanism for a wheel and axle assembly of a railway vehicle truck having a journal box carried by said assembly outside one of said wheels and having a truck frame slidably mounted on said journal box, said journal box having a radial flange at each of its opposite ends, an annular, rotatable friction braking element disposed between said wheel and frame and secured to rotate with said wheel, an annular, non-rotatable friction braking element, means secured to the inner flange of said journal box supporting said non-rotatable element in coaxial relation with said rotatable element and providing for movement of said non-rotatable braking element only in the direction of said rotatable element for frictionally engaging said rotatable element, a cover secured to the outer journal box flange over the end of the axle of said assembly, a brake cylinder piston in said cover operatively connected to said non-rotatable braking element for controlling movement thereof, and torque means operatively connecting the flange at the outer end of said journal box to said frame for holding said non-rotatable element against turning.

16. A brake mechanism for a wheel and axle assembly of a railway vehicle truck comprising a member disposed in a chamber at one side of said wheel and secured to rotate with said wheel, said chamber being open to the atmosphere, an annular rotatable friction braking element secured to rotate with said wheel and having a plurality of radial ducts open at their inner ends to said chamber and at their outer ends through the periphery of the rotatable element to the atmosphere and operative upon rotation to draw air from the atmosphere through said chamber, and to force said air outwardly through said ducts to the atmosphere, an annular non-rotatable friction braking element disposed to frictionally engage said rotatable element to brake said wheel, and fan blades on said member for forcing air from said chamber to the inner ends of said ducts.

17. A brake mechanism for a wheel and axle assembly of a railway vehicle truck comprising a member disposed in a chamber at one side of said wheel and secured to rotate with said wheel, said chamber being open to the atmosphere, a filler block fitting the contour of the web portion of said wheel and having an outer face formed perpendicular to the axis of said wheel, an annular, rotatable friction braking disc mounted against said outer face of said filler block, means securing said rotatable disc and filler block to said wheel for rotation therewith, an annular non-rotatable friction braking disc disposed to frictionally engage the outer face of said rotatable disc to brake said wheel, said rotatable disc having a plurality of air ducts in each of its opposite faces open at their inner ends to said chamber and open at their outer ends through the periphery of said rotatable element to the atmosphere and operative upon rotation to force air outwardly through said ducts, and fan blades on said member for forcing air from said chamber to the inner ends of said ducts.

18. A brake mechanism for a wheel and axle assembly of a railway vehicle truck having a journal box carried by said assembly outside of one of said wheels, said mechanism comprising annular rotatable and non-rotatable friction braking elements disposed in coaxial relation and adapted to frictionally interengage to brake said wheel, said rotatable element being secured to rotate with said wheel, means carried by said journal box for supporting said non-rotatable braking element, a pressure ring encircling said journal box and slidably mounted at one end thereon and having its opposite end engaging said non-rotatable element and forming between said ends two sides of a chamber open only to the atmosphere and to the inner peripheral edges of said braking elements, means for operating said pressure ring to move said non-rotatable element into frictional engagement with said rotatable element, fan means disposed in said chamber and rotatable with said wheel to draw air from the atmosphere and force same to the inner peripheral surface of said braking elements, said rotatable braking element having a plurality of air ducts open at their opposite ends to the inner and outer peripheral surfaces thereof and operative upon rotation of said rotatable elements to force air outwardly through said ducts.

19. A brake cylinder device comprising a casing, a piston slidably mounted in said casing and having at one side a pressure chamber and at the opposite side a non-pressure chamber, a piston rod separate from said piston slidably mounted in a bore in said casing and adapted to engage said piston in said non-pressure chamber, means for preventing leakage around said rod through said bore to said non-pressure chamber, said rod having an axial bore open at one end to said non-pressure chamber and at the opposite end outside of said casing to the atmosphere, and straining means in said axial bore for straining foreign matter from the air entering said non-pressure chamber through said axial bore.

20. A brake cylinder device comprising a casing, a piston slidably mounted in said casing and having at one side a pressure chamber and at the opposite side a non-pressure chamber, a piston rod separate from said piston slidably mounted in a bore in said casing and adapted to engage said piston in said non-pressure chamber, a collapsible boot encircling said rod and sealed at one end to said rod and at the opposite end to said casing for preventing leakage around said rod through said bore to said non-pressure chamber, said rod having an axial bore open at one end to said non-pressure chamber and open at the opposite end to the atmosphere, and a strainer in said axial bore for straining foreign matter from air entering said non-pressure chamber through said axial bore.

21. A brake mechanism for a wheel and axle assembly of a railway vehicle truck having a journal box carried by said assembly and a truck frame mounted on said journal box, said mechanism comprising an annular rotatable friction braking element secured to rotate with said assembly, an annular non-ratatable friction braking element disposed in coaxial relation with said rotatable braking element, said braking element being located between a wheel and said truck frame, a brake cylinder piston located outside of said truck frame and associated with said journal box and connected to said non-rotatable element and adapted to be operated from a release position by fluid under pressure for moving said non-rotatable element into frictional braking engagement with said rotatable element for braking said assembly, spring means acting on said piston for moving same to said release position upon the release of fluid under pressure from said piston, and other spring means acting on said non-rotatable element for moving same out of engagement with said rotatable element upon movement of said brake cylinder piston to release position.

22. In a railway car truck having a frame, a journal box, a wheel and axle assembly having an axle supported in said journal box, a brake comprising rotors and stators interleaved between a wheel of said assembly and the adjacent end of said journal box, a brake cylinder device located at the opposite end of said journal box and operatively connected to said brake for actuating same, and means for supporting said brake cylinder device at said opposite end of said journal box.

23. In a railway car truck having a frame, a journal box, a wheel and axle assembly having an axle supported in said journal box, a brake comprising rotors and stators interleaved between a wheel of said assembly and the adjacent end of said journal box, a brake cylinder device at the opposite end of said journal box, means extending through said journal box connecting said brake cylinder device to said brake to actuate same, and means supporting said brake cylinder device and stators from the ends of said journal box respectively adjacent thereto.

24. In a railway car truck having a frame, a journal box, a wheel and axle assembly having an axle supported in said journal box, a brake comprising rotors and stators interleaved between a wheel of said assembly and the adjacent end of said journal box, said stators being carried by said adjacent end of said journal box, a brake cylinder device disposed at the opposite end of said journal box, means securing said journal box to said opposite end of said journal box, and pressure transmitting means carried by said journal box operatively connecting said brake cylinder device to said brake for actuating same.

25. In a railway car truck having a frame, a journal box, a wheel and axle assembly having an axle supported in said journal box, a brake comprising rotors and stators interleaved between a wheel of said assembly and the adjacent end of said journal box, a brake cylinder casing, means removably securing said casing to the opposite end of said journal box, a fluid actuated piston in said casing, and means connecting said piston to said brake for actuating said brake.

26. In a railway car truck having a frame, a journal box having end flanges, a wheel and axle assembly having an axle supported in said box, a brake comprising rotors and stators interleaved between a wheel of said assembly and the adjacent end of said journal box, means carrying said stators supported by the flange on said journal box which is adjacent said brake, a brake cylinder device disposed adjacent the opposite end flange of said journal box and operatively connected to said brake for actuating same, and means securing said brake cylinder device to said opposite end flange.

27. In a railway car truck having a frame, a journal box having end flanges, a wheel and axle assembly having an axle supported in said box, a brake comprising rotors and stators interleaved between a wheel of said assembly and the adjacent end of said journal box, means carrying said stators supported by the flange on said journal box which is adjacent said brake, a brake cylinder device located upon the opposite end flange of said journal box in coaxial relation with said assembly, means removably securing said brake cylinder device to said opposite end flange, and a plurality of pins spaced from each other around the axle bearing in said journal box and slidably mounted in said flanges in a direction parallel to the axis of said bearing and operatively connecting said brake cylinder device to said brake.

28. In a railway car truck having a frame, a journal box, a wheel and axle assembly having an axle supported in said journal box, a brake comprising rotors and stators interleaved between a wheel of said assembly and the adjacent end of said journal box, means securing said stators to the adjacent end of said journal box for supporting same and for holding same against movement in a direction around the axis of said box, torque means operatively connecting the opposite end of said journal box to said frame, a brake cylinder device located at the opposite end of said journal box and operatively connected to said brake for actuating same, and means connected to said opposite end of said journal box carrying said brake cylinder device.

29. In a railway car truck having a frame, a journal box, a wheel and axle assembly having an axle supported in said box, a brake comprising rotors and stators interleaved between a wheel and said box, an operating means disposed adjacent each of the opposite ends of said box independently operable to apply said brake, means supporting one of said operating means at the adjacent end of said box and means supporting the other operating means at the opposite end of said box.

30. In a railway car truck having a frame, a journal box, a wheel and axle assembly having an axle supported in said box, a brake comprising rotors and stators interleaved between a wheel and said box, power means disposed at one end of said box operable to apply said brake, means associated with said box carrying said power means, hand brake means disposed at the opposite end of said box operable to apply said brake, and means associated with said box carrying said hand brake means.

31. In a railway car truck having a frame, a journal box, a wheel and axle assembly having an axle supported in said box, a brake comprising rotors and stators interleaved between a wheel and said box, hand brake means disposed at the end of said box adjacent said brake for applying said brake, means supporting said hand brake means from said box, power means disposed at the opposite end of said box for also applying said brake, and means supporting said power means from said box.

ELLIS E. HEWITT.